(12) United States Patent
Cross

(10) Patent No.: US 8,701,652 B2
(45) Date of Patent: *Apr. 22, 2014

(54) GAS BARBEQUE GRILL WEATHER COVER

(76) Inventor: Del Cross, Seattle, WA (US)

( * ) Notice: Subject to any disclaimer, the term of this patent is extended or adjusted under 35 U.S.C. 154(b) by 261 days.

This patent is subject to a terminal disclaimer.

(21) Appl. No.: 13/065,862

(22) Filed: Mar. 30, 2011

(65) Prior Publication Data

US 2012/0247446 A1 Oct. 4, 2012

(51) Int. Cl.
*A47J 37/07* (2006.01)
*A47J 36/36* (2006.01)
*F24B 3/00* (2006.01)

(52) U.S. Cl.
USPC ........ 126/214 D; 126/25 R; 126/29; 126/211; 99/359; 135/96; 219/386

(58) Field of Classification Search
CPC .......... A47J 37/0786; A47J 37/07; F24B 1/02
USPC ............. 126/25 R, 214 D, 29, 276, 211, 220; 99/359; 135/96; 219/386
See application file for complete search history.

(56) References Cited

U.S. PATENT DOCUMENTS

| | | | | |
|---|---|---|---|---|
| 1,328,071 A | * | 1/1920 | Baldwin | 126/276 |
| 1,513,357 A | * | 10/1924 | Webber | 126/268 |
| 1,550,638 A | * | 8/1925 | Taylor | 126/276 |
| 2,862,758 A | * | 12/1958 | Robertson | 296/168 |
| 3,397,881 A | * | 8/1968 | Hedgecock | 472/14 |
| 4,061,127 A | * | 12/1977 | Fisher | 126/515 |
| 4,877,011 A | * | 10/1989 | Willice | 126/25 R |
| 5,950,617 A | * | 9/1999 | Lorenz | 126/276 |
| 5,967,134 A | * | 10/1999 | Harris | 126/41 R |
| 6,199,549 B1 | * | 3/2001 | Yerkes | 126/276 |
| 6,561,178 B1 | | 5/2003 | Hayes | |
| 6,598,514 B2 | * | 7/2003 | Leggi | 99/339 |
| 6,606,986 B2 | * | 8/2003 | Holland et al. | 126/25 R |
| 7,107,983 B1 | * | 9/2006 | West | 126/25 R |
| 7,240,683 B2 | | 7/2007 | Zutich | |
| 7,354,120 B2 | * | 4/2008 | DeMars | 312/140.2 |
| 7,644,711 B2 | * | 1/2010 | Creel | 126/80 |
| 8,316,836 B2 | * | 11/2012 | Grasso et al. | 126/25 R |
| 8,353,279 B2 | * | 1/2013 | Jackovitch | 126/25 R |
| 8,353,280 B2 | * | 1/2013 | Jackovitch | 126/25 R |
| 2002/0179081 A1 | * | 12/2002 | Holland et al. | 126/25 R |
| 2003/0084895 A1 | | 5/2003 | Hayes | |
| 2005/0022801 A1 | | 2/2005 | Wu | |
| 2005/0133076 A1 | | 6/2005 | Zutich | |
| 2005/0155596 A1 | * | 7/2005 | Andrews et al. | 126/25 R |
| 2006/0054157 A1 | * | 3/2006 | Wang et al. | 126/25 R |

(Continued)

OTHER PUBLICATIONS

U.S. Appl. No. 13/076,131, filed Mar. 30, 2011, entitled "Charcoal Grill Weather Cover."

*Primary Examiner* — Kang Hu
*Assistant Examiner* — Daniel E Namay
(74) *Attorney, Agent, or Firm* — Lowe Graham Jones PLLC

(57) ABSTRACT

Gas barbeque grill weather cover systems are operable to shelter a gas barbeque grill from rainfall. An exemplary embodiment has a weather cover portion configured to be disposed above a cover portion of a gas barbeque grill and at least one support member with a first end configured to be secured to the weather cover portion and a second end configured to be secured to the gas barbeque grill cover portion. The weather cover portion is configured to substantially prevent rainfall becoming incident on an outer surface of the gas barbeque grill cover portion.

15 Claims, 3 Drawing Sheets

(56) References Cited

U.S. PATENT DOCUMENTS

| | | | |
|---|---|---|---|
| 2006/0278210 A1* | 12/2006 | Wang | 126/25 R |
| 2008/0041359 A1* | 2/2008 | Kim | 126/25 R |
| 2009/0199838 A1* | 8/2009 | Tsung | 126/214 D |
| 2009/0223547 A1 | 9/2009 | Schneider | |
| 2009/0308373 A1* | 12/2009 | Scott et al. | 126/25 R |
| 2011/0083659 A1* | 4/2011 | Grasso et al. | 126/25 R |
| 2012/0247446 A1* | 10/2012 | Cross | 126/25 R |
| 2012/0247447 A1* | 10/2012 | Cross | 126/25 R |
| 2013/0008427 A1* | 1/2013 | Ahmed | 126/25 R |

* cited by examiner

US 8,701,652 B2

GAS BARBEQUE GRILL WEATHER COVER

BACKGROUND

FIG. 1 illustrates an exemplary prior art gas barbeque grill 102. The exemplary gas barbeque grill 102 may use propane or natural gas. The gas barbeque grill 102 is illustrated as comprising a base portion 104, a cover portion 106, a support portion 108, and an optional cabinet portion 110. A first handle 112 is affixed on the top of the cover portion 106 to facilitate repositioning of the cover portion 106 so that a user can access cooking food that resides in the base portion 104 of the gas barbeque grill 102. An optional second handle 114 is affixed to the base portion 104 to facilitate relocation of the gas barbeque grill 102. Handles 112, 114 may be affixed in alternative locations on the gas barbeque grill 102, and/or other handles (not shown) may be used. An optional thermometer 116 disposed on the exterior of the cover portion 106 may be included to indicate the cooking temperature within the cooking chamber of the gas barbeque grill 102.

In inclement weather situations, such as when rainfall 118 is present, maintaining the internal temperate of the gas barbeque grill 102 may become difficult due to the evaporative cooling effect of the rainfall 118 falling on the surface of the cover portion 106 of the gas barbeque grill 102. That is, as the rainfall 118 lands on the cover portion 106, formed steam 120 results in an evaporative cooling effect, thereby reducing the internal cooking temperature of the gas barbeque grill 102.

If a shelter, such as an overhanging porch, canopy, tree or the like is available, the gas barbeque grill 102 may be moved to a location away from the rainfall 118. However, such shelters are not always available and/or conveniently accessible.

U.S. Pat. No. 6,561,178 discloses an umbrella assembly that attaches to the base portion 104 of the gas barbeque grill 102. However, the umbrella assembly may not be adequately sturdy for extreme inclement weather conditions, such as strong winds. Further, the rainfall 118 may still be able to fall on the cover portion 106 when a strong wind blows the rainfall 118 at an angle towards the gas barbeque grill 102. Also, the umbrella assembly is relatively difficult to remove from the base portion 104 of the gas barbeque grill 102 in the event that the gas barbeque grill 102 is moved any significant distance, such as when the user transports their gas barbeque grill 102 from their backyard to a picnic or a campground. And, the fabric used to construct the umbrella may not be heat resistant, and may therefore be subject to heat damage.

Accordingly, there is a need in the arts for improved protection from rainfall and other ambient conditions that may adversely impact the internal cooking temperature of the gas barbeque grill 102.

SUMMARY

Propane gas grill weather cover systems are operable to shelter a propane gas grill from rainfall. An exemplary embodiment has a weather cover portion configured to be disposed above a cover portion of a gas barbeque grill and at least one support member with a first end configured to be secured to the weather cover portion and a second end configured to be secured to the gas barbeque grill cover portion. The weather cover portion is configured to substantially prevent rainfall becoming incident on an outer surface of the gas barbeque grill cover portion.

BRIEF DESCRIPTION OF THE DRAWINGS

Preferred and alternative embodiments are described in detail below with reference to the following drawings.

DETAILED DESCRIPTION

Figure 2:
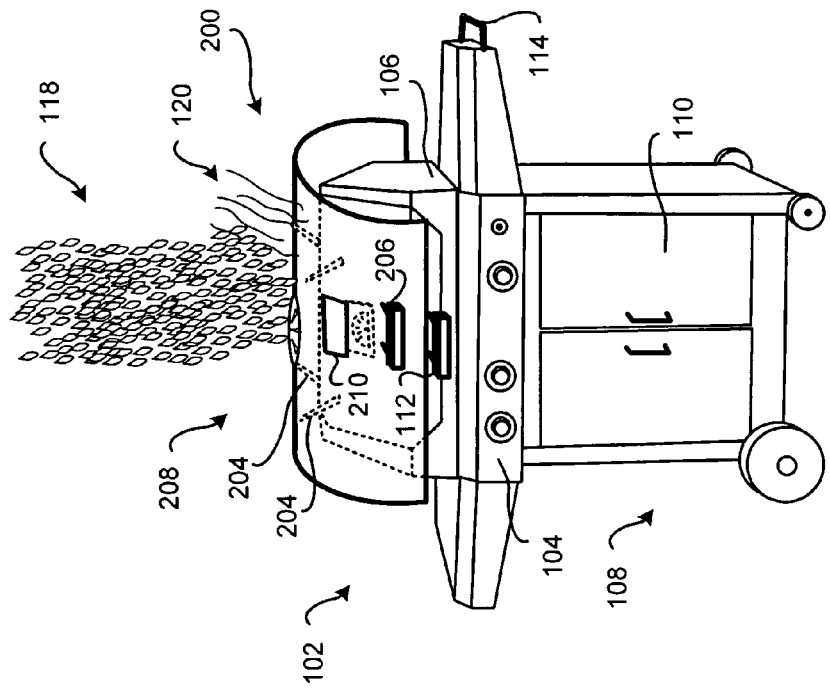
FIG. 2 is a perspective diagram of an embodiment of a gas barbeque grill weather cover affixed to the propane gas grill.
Figure 1:
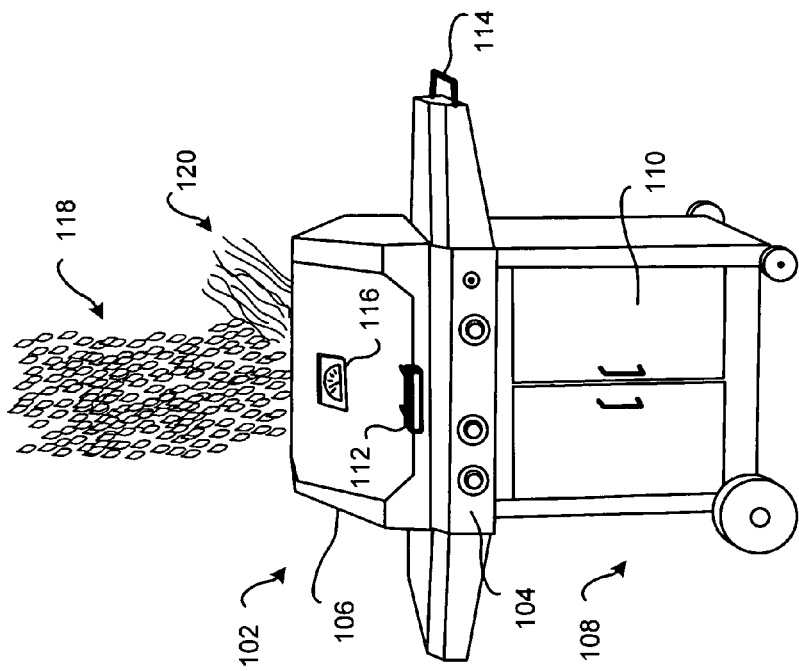
FIG. 1 illustrates an exemplary prior art gas barbeque grill 102.

FIG. 2 is a block diagram of an embodiment of a gas barbeque grill weather cover 200 affixed to a cover portion 106 of the gas barbeque grill 102. An exemplary embodiment of the gas barbeque grill weather cover 200 comprises a weather cover portion 202, four support members 204, and an optional handle 206.

The gas barbeque grill weather cover 200 is configured to prevent rainfall 120 or other precipitation from becoming incident onto the cover portion 106 of the gas barbeque grill 102, thereby helping to maintain the internal temperate of the gas barbeque grill 102. That is, the prevention of incident precipitation on the cover portion 106 of the gas barbeque grill 102 reduces or eliminates the evaporative cooling effect of the rainfall 120 otherwise falling on the surface of the cover portion 106 of the gas barbeque grill 102.

The exemplary gas barbeque grill weather cover 200 is affixed to a gas barbeque grill 102 that cooks food using a gas, such as natural gas, propane, or the like. Embodiments of the gas barbeque grill weather cover 200 may be configured for, and affixed to, any suitably shaped gas barbeque grill 102.

Preferably, the weather cover portion 202 is fabricated from a suitable metal. Other materials may be used, such as a plastic or a heat resistant fabric.

The support members 204 affix the weather cover portion 202 at a fixed distance above the cover portion 106 of the gas barbeque grill 102. Preferably, the distance above the cover portion 106 of the gas barbeque grill 102 is several inches, although any distance may be used to create an insulative region of air between the gas barbeque grill weather cover 200 and the cover portion 106 of the gas barbeque grill 102. Alternative embodiments may user fewer numbers of, or may use greater numbers of, the support members 204.

Once the gas barbeque grill weather cover 200 is affixed to the cover portion 106 of the gas barbeque grill 102, the gas barbeque grill weather cover 200 and the cover portion 106 of the gas barbeque grill 102 become a substantially rigid cover unit. Accordingly, the user may use the handle 206 on the weather cover portion 202 to open up the top of the gas barbeque grill 102 for access to cooking foods within the cooking chamber of the gas barbeque grill 102. Further, in the event that the user wishes to transport their gas barbeque grill 102, such as from their backyard to a picnic or a campground, the entire gas barbeque grill 102 and gas barbeque grill weather cover 200 unit may be easily moved.

The exemplary weather cover portion 202 is illustrated as a cylindrical portion that substantially encompasses at least the cover portion 106 of the gas barbeque grill 102. The weather cover portion 202 extends lengthwise from a first edge to a second edge of the cover portion 106 of the gas barbeque grill 102. In some embodiments, the length and/or width of the cylindrical shaped weather cover portion 202 may be greater than the extent of the cover portion 106 of the gas barbeque grill 102 so as to provide increased sheltering from the rainfall 118. In alternative embodiments, the length or width of the cylindrical shaped weather cover portion 202 may extend beyond only one edge, or even all edges, of the cover portion 106 of the gas barbeque grill 102. Other covering shapes may be used for the weather cover portion 202, such as arcs, rectangles, flat sheets, curved sheets, or combinations thereof.

An exemplary embodiment includes an optional ventilation port 208. The weather cover portion 202 permits the user to adjust the air flow control means of the ventilation port 208.

Depending upon the location of the optional thermometer 116 on the cover portion 106 of the gas barbeque grill 102, the weather cover portion 202 permits convenient viewing access to the optional thermometer 116. In the event that the user's view of the thermometer 116 is blocked, or partially blocked, a viewport 210 may be provided on the weather cover portion 202 to provide viewing access to the thermometer 116. The viewport 210 may optionally include a transparent cover.

Figure 3:
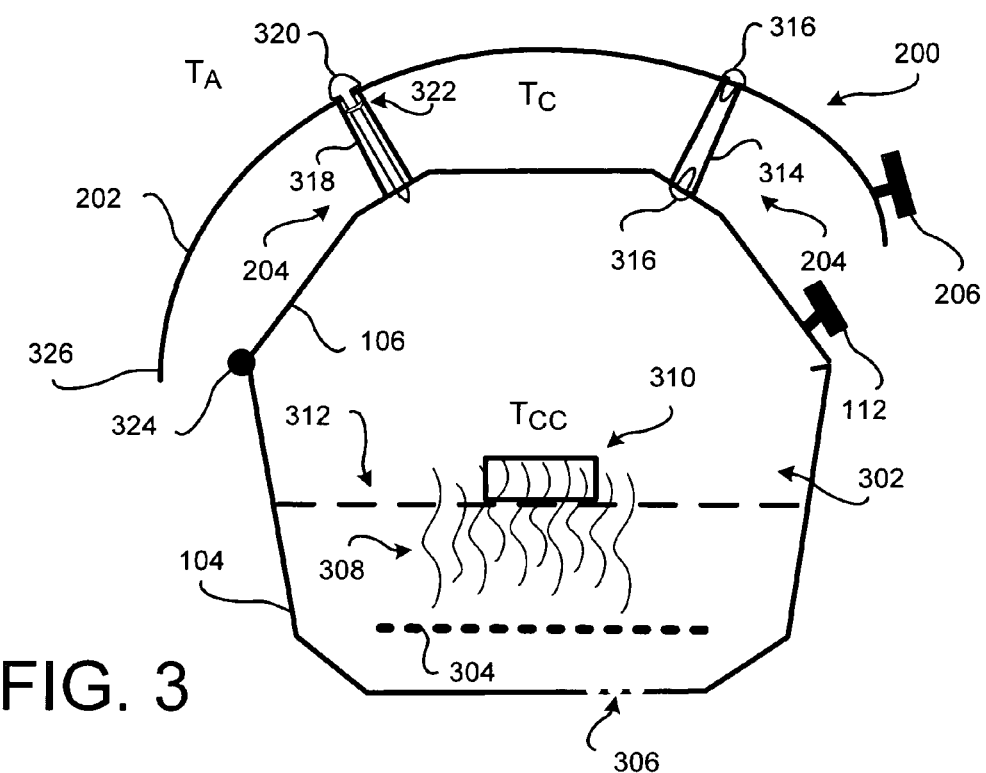
FIG. 3 is a cross sectional view of the gas barbeque grill 102 and the gas barbeque grill weather cover embodiment of FIG. 2.

FIG. 3 is a cross sectional view of the gas barbeque grill 102 and the gas barbeque grill weather cover 200 of FIG. 2. The base portion 104 and the cover portion 106 of the gas barbeque grill 102 cooperatively define a cooking chamber 302.

A gas burner heating element 304 above the bottom surface of the base portion 104 is configured to combust gas provided by a gas source (not shown). An optional air intake port 306 is disposed on the bottom of the base portion 104 to provide a supply of fresh air. As the heated air 308 rises, fresh air is drawn through the air intake port 306 to refresh the oxygen supply that is necessary to maintain combustion of natural gas or propane.

The heated rising air 308 heats the temperature of cooking chamber ($T_{CC}$). Food items 310 placed on the grill 312 will cook when the temperature of cooking chamber ($T_{CC}$) is at a suitable cooking temperature. When rain falls upon embodiments of the weather cover portion 202, evaporative cooling does not as quickly affect the temperature of cooking chamber ($T_{CC}$). The cool rainfall, and/or any evaporative cooling effects, will reduce the cover temperature ($T_C$) of the weather cover portion 202. Since air is itself a reasonable insulator, the air between the gas barbeque grill weather cover 200 and the cover portion 106 of the gas barbeque grill 102 will reduce the rate of the decrease in the temperature of cooking chamber ($T_{CC}$). Further, if the ambient temperature (TA) itself is relatively cold, the relatively warmer air between the gas barbeque grill weather cover 200 and the cover portion 106 of the gas barbeque grill 102 will help maintain temperature and/or reduce the rate of the decrease in the temperature of the cooking chamber ($T_{CC}$).

In an exemplary embodiment, the plurality of support members 204 are post-like structures that comprise a tubular portion 314 with optional internal threading that is configured to receive a mating screw 316. The mating screws 316 affix the threaded receiving ends of the tubular portion 314 to the weather cover portion 202 of the gas barbeque grill weather cover 200, and to the cover portion 106 of the gas barbeque grill 102

In another embodiment, the plurality of support members 204 are post-like structures that comprise a tubular portion 318 with through-hole extending there through. A screw 320 affixes one end of the tubular portion 318 to the cover portion 106 of the bar gas barbeque grill 102. In an exemplary embodiment, the screw 320 is a self-tapping screw. The self-tapping screw 320 is configured to enter into the relatively soft metal material of the cover portion 106 of the gas barbeque grill 102. An optional keeper 322 may be employed to hold the screw 320 in place when the user is affixing the support members 204 to the cover portion 106 of the gas barbeque grill 102.

The above-described embodiments are particularly suitable for an aftermarket product that may be affixed to a previously purchased gas barbeque grill 102. The user need only drill holes in suitable locations on the cover portion 106 of the gas barbeque grill 102. Or, the weather cover portion 202 may be secured to the cover portion 106 of the gas barbeque grill 102 using a powered driver to drive the self-tapping screws 320.

Alternatively, or additionally, the gas barbeque grill weather cover 200 may be preconfigured to be affixed to the cover portion 106 of the gas barbeque grill 102 by the original equipment manufacturer (OEM). The OEM could include the preconfigured gas barbeque grill weather cover 200 as part of the originally purchased gas barbeque grill 102, or may provide the gas barbeque grill weather cover 200 as a separately purchased feature.

In alternative embodiments, the support members 204 may employ a different construction and/or shape, and/or may fasten the gas barbeque grill weather cover 200 to the cover portion 106 of the gas barbeque grill 102 using other means. For example, but not limited to, folding tabs, bolts, pins, rivets, snaps, latches, and/or adhesives may be used to affix the support members 204 to the weather cover portion 202 and or the cover portion 106 of the gas barbeque grill 102. In some embodiments, the support members 204 are a fabricated part of the gas barbeque grill weather cover 200, such as a fabricated protrusion or the like. Further, any suitable shape may be used for the structure of the support members 204.

In some embodiments, the weather cover portion 202 is affixed to the cover portion 106 of the gas barbeque grill 102 using alternative structures. An exemplary alternative structure includes, but is not limited to, a block, a protrusion, a wire, or the like.

In many types of gas barbeque grills 102, the cover portion 106 is affixed to the base portion 104 using a hinge structure 324. The hinge structure 324 is configured to allow the user to raise the cover portion 106 of the gas barbeque grill 102. When the user releases the cover portion 106 when in the open position, the cover portion 106 remains stationary. Embodiments of the weather cover portion 202 are configured to maintain this operating feature of such gas barbeque grills 102. Accordingly, in an exemplary embodiment, the lower edge 326 of the backside of the weather cover portion 202 does not extend so far downward as to engage the base portion 104 when the cover portion 106 of the gas barbeque grill 102 is moved to its open position. Further, embodiments of the weather cover portion 202 may be configured to maintain the center of gravity of the weather cover portion 202 and cover portion 106 unit so that the cover portion 106 remains open after it is moved to its open position.

Figure 4:
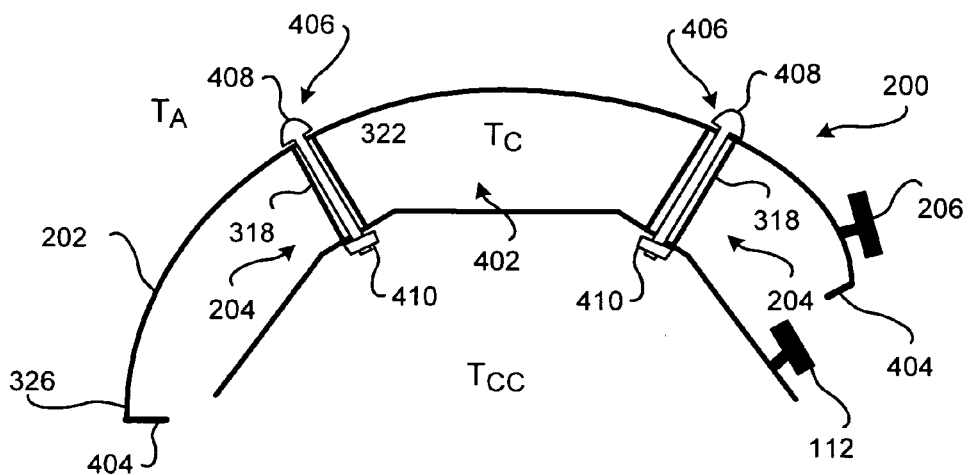
FIG. 4 is a cross section diagram of an alternative embodiment of a gas barbeque grill weather cover.

FIG. 4 is a cross section diagram of an alternative embodiment of a gas barbeque grill weather cover 200. In some embodiments, it may be desirable to retard the natural convective airflow in the region of space 402 between the gas barbeque grill weather cover 200 and the cover portion 106 of the gas barbeque grill 102. Reducing the natural convective air flow in the region of space 402 helps to maintain the cover temperature ($T_C$). That is, the reduced convective flow of air about the region of space 402 results in less exhaustion of the warmer air about the cover temperature ($T_C$) and reduces the inflow of cooler ambient air into the region of space 402.

In the exemplary embodiment of the gas barbeque grill weather cover 200 illustrated in FIG. 4, the lower edges and/or end edges of the weather cover portion 202, or portions thereof, include a lip 404. The lip 404 may be any suitable inwardly protruding structure at the lower edges and/or end edges of the weather cover portion 202. The lip 404 retards the exhaustion of the warmer air, at the cover temperature ($T_C$), and reduces the inflow of cooler ambient air into the region of space 402.

The lip 404 may encompass the entire lower edges and/or end edges of the weather cover portion 202, or may be used at selected locations on the lower edges and/or end edges of the weather cover portion 202. The lip 404 may be a fold or bend in the material of the weather cover portion 202. Alternatively, the lip 404 may be a separate structure that is affixed to the lower edges and/or end edges of the weather cover portion 202 using any suitable means. For example, but not limited to, a separately attachable lip 404 may be affixed to the weather cover portion 202 using screws, bolts, pins, rivets, snaps, latches, wires, and/or adhesives.

In an alternative embodiment, the support member 204 may include a bolt and nut assembly 406. A bolt 408 extends through the through-hole of the support member 204 such that the nut 410, once secured to the threaded end of the bolt 408, affixes the end of the support member 204 to the cover portion 106 of the gas barbeque grill 102. Alternatively, the bolt 408 may extend through the through-hole of the support member 204 such that the nut 410, once secured to the threaded end of the bolt 408, affixes the end of the support member 204 to the weather cover portion 202.

Figure 5:
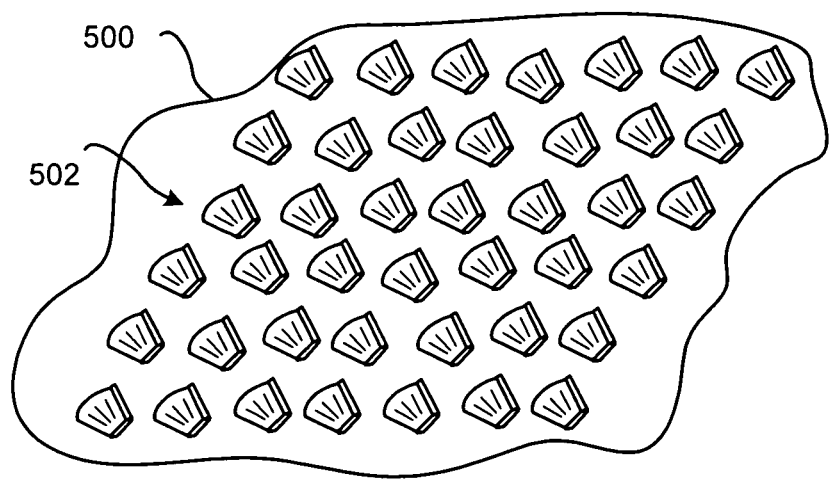
FIGS. 5 and 6 are perspective diagram of portions of the gas barbeque grill weather cover.

FIG. 5 is a perspective diagram of an underside portion 500 of the gas barbeque grill weather cover 200. A plurality of protrusions 502 are affixed to the underside portion 500 of the weather cover portion 202.

It is appreciated that there is an inherent natural convective airflow in the region 402 (FIG. 4) between the weather cover portion 202 and the cover portion 106 of the gas barbeque grill 102 as air near the surface of the cover portion 106 of the gas barbeque grill 102 is heated. The heated air tends to rise upwardly and towards the underside of the weather cover portion 202. The rising air continues to flow generally upward and then out around the edges of the weather cover portion 202 so as to exit into the ambient environment.

The plurality of protrusions 502 are configured to retard the flow of air between the weather cover portion 202 and the cover portion 106 of the gas barbeque grill 102 caused by the natural convective airflow. Any suitable number, size, shape and/or dimension of the protrusions 502 may be used. Different sizes, shapes and/or dimensions for the plurality of protrusions 502 may be used. In an exemplary embodiment, the plurality of protrusions 502 may be elongated "ribs" that extend across the underside of the weather cover portion 202.

The plurality of protrusions 502 may be individually secured to the underside of the weather cover portion 202 using a suitable fastening means, such as, but not limited to, folding tabs, bolts, pins, rivets, snaps, latches, and/or adhesives. Or, the plurality of protrusions 502 may be fabricated as part of the weather cover portion 202. Alternatively, or additionally, the plurality of protrusions 502 may be secured to the cover portion 106 of the gas barbeque grill 102.

Figure 6:
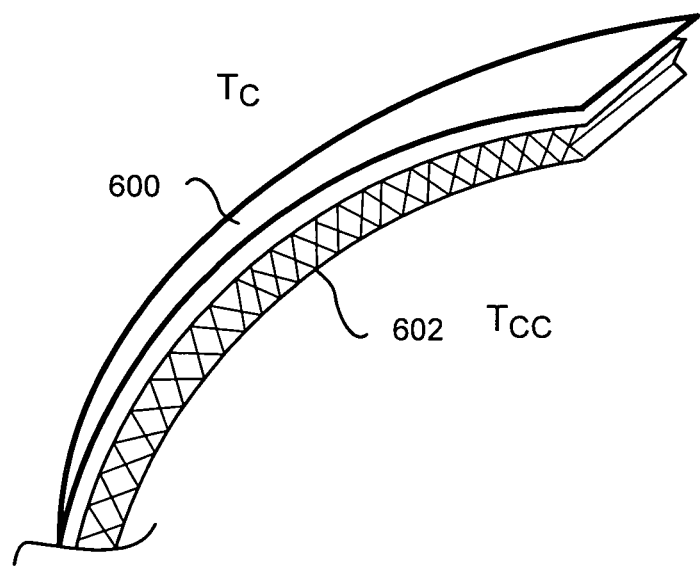

FIG. 6 is a perspective diagram of a portion 600 of the gas barbeque grill weather cover 200. In this exemplary embodiment, an insulating material 602 is affixed to the underside of the portion 600 of the weather cover portion 202 using a suitable fastening means, such as, but not limited to, folding tabs, bolts, pins, rivets, snaps, latches, and/or adhesives. In an exemplary embodiment, a heat resistant honey-combed insulator is used. The insulating material 602 facilitates maintaining the temperature ($T_C$). A warmer cover temperature ($T_C$) reduces the rate of the decrease in the temperature of cooking chamber ($T_{CC}$). In some embodiments, the air space between the weather cover portion 202 and the cover portion 106 of the gas barbeque grill 102 may be reduced or even eliminated.

It should be emphasized that the above-described embodiments of the gas barbeque grill weather cover 200 are merely possible examples of implementations of the invention. Many variations and modifications may be made to the above-described embodiments, particularly when different features of the various embodiments are interchanged and/or combined. All such modifications and variations are intended to be included herein within the scope of this disclosure and protected by the following claims.

The invention claimed is:

1. A gas barbeque grill weather cover system, comprising:
   a weather cover portion configured to be disposed above a cover portion of a gas barbeque grill,
   wherein the weather cover portion is substantially shaped as a portion of a cylinder that extends lengthwise over a first edge of the gas barbeque grill to an opposing edge of the gas barbeque grill,
   wherein the weather cover portion is defined by a first lower edge and an opposing second lower edge,
   wherein the weather cover portion is further defined by a first end and an opposing second end, wherein the first end and the second end extend in a curve from the first lower edge to the second lower edge; and
   wherein the weather cover portion is further defined by an exhaust portion disposed in the weather cover portion, and is located at an upper extent of the first end of the weather cover portion, wherein the exhaust portion is configured to facilitate an exhaust of combustion gases out exiting from a combustion chamber of the gas barbeque grill such that the combustion gases exiting from the exhaust portion of the weather cover portion are directed away from a user of the gas barbeque grill; and
   at least one support member with a first end configured to be secured to the weather cover portion and a second end configured to be secured to the gas barbeque grill cover portion,
   wherein the weather cover portion is configured to substantially prevent rainfall becoming incident on an outer surface of the gas barbeque grill cover portion.

2. The gas barbeque grill weather cover system of claim 1, wherein the support member defines a through-hole, further comprising:
   a self-tapping screw configured to extend through a tubular member, and configured to drill into and secure the support member to the gas barbeque grill cover portion.

3. The gas barbeque grill weather cover system of claim 1, wherein the support member defines a through-hole, further comprising:
   a bolt and nut assembly configured to extend through a tubular member, and configured to secure the support member to the gas barbeque grill cover portion.

4. The gas barbeque grill weather cover system of claim 1, wherein the support member includes a first threaded receiving end and a second threaded receiving end, further comprising:
   a first screw configured to extend through the weather cover portion to secure the first threaded receiving end of the support member to the weather cover portion; and
   a second screw configured to extend through the gas barbeque grill cover portion to secure the second threaded receiving end of the support member to the gas barbeque grill cover portion.

5. The gas barbeque grill weather cover system of claim 1, wherein the weather cover portion extends lengthwise beyond at least one of the first edge and the second edge of the gas barbeque grill cover portion.

6. The gas barbeque grill weather cover system of claim 1, further comprising:
a plurality of protrusions on an underside of the weather cover portion located on an interior surface of the weather cover portion, wherein the plurality of protrusions are between the first lower edge and the second lower edge, and wherein the plurality of protrusions extend downwardly and are configured to impede a convective flow of air between the gas barbeque grill cover portion and the weather cover portion.

7. The gas barbeque grill weather cover system of claim 1, further comprising:
a lip on the lower edge of the weather cover portion, wherein the lip is configured to impede a convective flow of air between the gas barbeque grill cover portion and the weather cover portion.

8. A gas barbeque grill, comprising:
a gas barbeque grill base portion configured to house a gas burner heating element;
a gas barbeque grill cover portion configured to be disposed over the top of the gas barbeque grill base portion, wherein the gas barbeque grill base portion and the gas barbeque grill cover portion define a cooking chamber;
a weather cover portion configured to be disposed above the gas barbeque grill cover portion,
wherein the weather cover portion is substantially shaped as a portion of a cylinder that extends lengthwise over a first edge of the gas barbeque grill to an opposing second edge of the gas barbeque grill,
wherein the weather cover portion is defined by a first lower edge and an opposing second lower edge,
wherein the weather cover portion is further defined by a first end, wherein the first end extends in a curve from the first lower edge to the second lower edge;
wherein the weather cover portion is further defined by an exhaust portion located at an upper extent of the first end of the weather cover portion, wherein the exhaust portion is configured to facilitate an exhaust of combustion gasses exiting from a combustion chamber of the gas barbeque grill such that the combustion gasses exiting from the exhaust portion of the weather cover portion are directed away from a user of the gas barbeque grill, and
wherein the weather cover portion is further defined by a second end that opposes the first end and that extends in a curve from the first lower edge to the second lower edge, wherein the second end is configured to facilitate access by the user to a surface of the gas barbeque grill cover portion; and
at least one support member with a first end configured to be secured to the weather cover portion and a second end configured to be secured to the gas barbeque grill cover portion,
wherein the weather cover portion is configured to substantially prevent rainfall becoming incident on an outer surface of the gas barbeque grill cover portion.

9. The gas barbeque grill of claim 8, wherein the weather cover portion extends lengthwise beyond at least one of a first edge and a second edge of the gas barbeque grill cover portion.

10. The gas barbeque grill of claim 8, further comprising:
a plurality of protrusions located on an underside of the weather cover portion, wherein the plurality of protrusions are between the first lower edge and the second lower edge, and wherein the plurality of protrusions extend downwardly and are configured to impede a convective flow of air between the gas barbeque grill cover portion and the weather cover portion.

11. A gas barbeque grill weather cover system, comprising:
a gas barbeque grill weather cover means for preventing precipitation from becoming incident on an outer surface of a cover portion of a gas barbeque grill,
wherein the gas barbeque grill weather cover means is substantially shaped as a portion of a cylinder that extends lengthwise over a first edge of the cover portion to an opposing second edge of the gas barbeque grill,
wherein the gas barbeque grill weather cover means is defined by a first lower edge and an opposing second lower edge,
wherein the gas barbecue grill weather cover means is further defined by a first end, wherein the first end extends in a curve from the first lower edge to the second lower edge;
wherein the gas barbecue grill weather cover means is further defined by an exhaust portion located at an upper extent of the first end of the gas barbeque grill weather cover means, wherein the exhaust portion is configured to facilitate an exhaust of combustion gasses exiting from a combustion chamber of the gas barbeque grill such that the combustion gasses exiting from the exhaust portion of the gas barbeque grill weather cover means are directed away from a user of the gas barbeque grill,
wherein the gas barbeque grill weather cover means is further defined by a second end that opposes the first end and that extends in a curve from the first lower edge to the second lower edge, wherein the second end is configured to facilitate access by the user to a ventilation port disposed on a surface of the gas barbeque grill; and
at least one support member means for securing the gas barbeque grill weather cover means to the gas barbeque grill cover portion.

12. The gas barbeque grill weather cover system of claim 1, wherein the support member has a length that positions the weather cover portion above the gas barbeque grill to facilitate access by the user to a surface of the gas barbeque grill.

13. The gas barbeque grill of claim 8, wherein the support member has a length that positions the weather cover portion above the gas barbeque grill to facilitate access by the user to the surface of the gas barbeque grill cover portion.

14. The gas barbeque grill weather cover system of claim 11, wherein the second end is configured to facilitate access by the user to a surface of the gas barbeque grill cover portion.

15. The gas barbeque grill weather cover system of claim 11, wherein the support member means has a length that positions the weather cover means above the gas barbeque grill to facilitate access by the user to a surface of the gas barbeque grill cover portion.

* * * * *